United States Patent
Lin et al.

(10) Patent No.: US 10,128,743 B2
(45) Date of Patent: Nov. 13, 2018

(54) INTEGRATED PFC AND PWM CONTROLLER WITH A PLURALITY OF FREQUENCY-LOAD CURVES

(71) Applicant: INNO-TECH CO., LTD., Taipei (TW)

(72) Inventors: Shu-Chia Lin, Taipei (TW); Ching-Yuan Lin, Taipei (TW); Chih Feng Lin, Taipei (TW); Wen-Yueh Hsieh, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 215 days.

(21) Appl. No.: 15/182,689

(22) Filed: Jun. 15, 2016

(65) Prior Publication Data

US 2017/0302157 A1    Oct. 19, 2017

(30) Foreign Application Priority Data

Apr. 18, 2016 (TW) .............................. 105112001 A

(51) Int. Cl.
*H02M 1/42* (2007.01)
*H02M 3/335* (2006.01)
*H02M 1/08* (2006.01)
*H02M 1/00* (2006.01)

(52) U.S. Cl.
CPC ............... *H02M 1/42* (2013.01); *H02M 1/08* (2013.01); *H02M 1/4225* (2013.01); *H02M 3/33523* (2013.01); *H02M 2001/007* (2013.01)

(58) Field of Classification Search
CPC ......... H02M 3/33523; H02M 3/33507; H02M 2001/0032; H02M 1/32; Y02B 70/16
See application file for complete search history.

*Primary Examiner* — Nguyen Tran
*Assistant Examiner* — Monica Mata
(74) *Attorney, Agent, or Firm* — Lin & Associates Intellectual Property, Inc.

(57) ABSTRACT

Disclosed is an integrated PFC and PWM controller with a plurality of frequency-load curves to minimize the no-load power consumption and maximize 4-point average efficiencies. The controller selects a frequency-load curve among the plurality of frequency-load and controls the PFC stage and the PWM stage to operate in HM, BM, DCM, or CCM based on the combined result from the input voltage and the output load sense signal, fetched respectively from the input terminal of the PFC stage and the output terminal of the PWM stage. The controller has the PSU operate in HM in case of no load, and operate in BM, DCM or CCM as the load increases across the flyback out rail.

8 Claims, 3 Drawing Sheets

INTEGRATED PFC AND PWM CONTROLLER WITH A PLURALITY OF FREQUENCY-LOAD CURVES

CROSS-REFERENCE TO RELATED APPLICATION

This application claims the priority of Taiwanese patent application No. 105112001, filed on Apr. 18, 2016 and incorporated herewith by reference.

BACKGROUND OF THE INVENTION

1. Field of the Invention

The present invention relates to an integrated Power Factor Correction (PFC) and Pulse Width Modulation (PWM) controller, and more specifically to an integrated PFC and PWM controller with a plurality of frequency-load curves to make a Power Supply Unit (PSU) more energy-efficient, i.e. to minimize the no-load power consumption and maximize 4-point average efficiencies. Each frequency-load curve has four operating modes: Holdup Mode (HM), Burst Mode (BM), Discontinuous Conduction Mode (DCM), and Continuous Conduction Mode (CCM). The disclosed controller selects a frequency-load curve among the plurality of frequency-load curves and controls the PFC stage and the PWM stage to operate in HM, BM, DCM, or CCM based on the combined result from the input voltage and the output load sense signals, fetched respectively from the input terminal of the PFC stage and the output terminal of the PWM stage. More specifically, the disclosed controller, which can be realized in any shape or form, be it analog or digital; discrete or integrated, would have the PSU operate in HM in case of no load, in BM in case of little load, in DCM in case of light load, or in CCM in case of heavy load across the flyback output rail. In other words, the integrated controller controls the PSU to operate in BM, DCM and CCM as the load increases.

2. The Prior Arts

Causing the AC input current to be in phase with the AC input voltage from the AC mains, a resistor consumes real power. On the contrary, an inductor or a capacitor stores and releases imaginary power from and to the AC mains because of causing the AC input current to be in quadrature with the AC input voltage. Simply put, a resistive load only consumes real power while an inductive or capacitive load not only consumes real power but also stores and releases imaginary power.

The imaginary power, flowing back and forth between the AC mains and the AC load, leads to an increased power line loss power companies wouldn't take lying down. Therefore, power companies strongly request that the Power Factor (PF) of large electrical or electronic devices be strictly corrected to an acceptable value to get rid of unnecessary burden and waste. The higher the PF, the less the imaginary power and the less the power line loss.

Generally speaking, to correct the PF is to align the AC input current to be in phase with the AC input voltage. When it comes to switch-mode power supplies, a PWM stage whose AC input power exceeds 75 W and whose AC input current is far from being sinusoidal should be preceded by a PFC stage to keep the AC input current both in phase and in shape with the AC input voltage so that the combination of the PFC stage and the PWM stage would take in a quasi-sinusoidal AC current just like a resistor with unity PF.

In prior arts where 90~150 W power adapters are of primary interest, the PFC stage is generally implemented/realized with a Discontinuous Conduction Mode (DCM) PFC, a Boundary Conduction Mode (BCM) PFC, or a Continuous Conduction Mode (CCM) PFC and the PWM stage with a Single-Switch Quasi-Resonant (SS-QR) flyback converter or a Dual-Switch Quasi-Resonant (DS-QR) flyback converter, depending on the power demand. A world of integrated PFC and PWM controllers has also been developed for each of all 3*2=6 possible combinations of the PFC stage and the PWM stage.

Those traditional integrated PFC and PWM controllers can perform up to par, but the problem is that they are all limited to having a single frequency-load curve, making the minimization of the no-load power consumption or the maximization of 4-point average efficiencies a difficult job for PSU designers.

In view of this deficiency of traditional integrated PFC and PWM controllers, the present invention left no stone unturned in search of no-load power consumption minimization and 4-point average efficiencies maximization and came up with an integrated PFC and PWM controller with a plurality of frequency-load curves to do the trick.

SUMMARY OF THE INVENTION

The primary objective of the present invention is to provide an integrated PFC and PWM controller with a plurality of frequency-load curves so that PSU designers can walk away with no-load power consumption minimization and 4-point average efficiencies maximization when shouldering the heavy burden of developing 90~150 W highly efficient power adapters. For the sake of simplifying the description of the present invention, the PFC stage and the PWM stage would be assumed hereafter to be a CCM PFC and a SS-QR flyback converter, respectively.

The PFC stage, consisting of a PFC input capacitor, a PFC inductor, a PFC switch, a PFC rectifier, and a PFC output capacitor as a front-end pre-regulator, has two functions: stepping a lower sinusoidal DC input voltage (0~373 Vdc typical) up to a higher regulated DC output voltage (390~410 Vdc typical) and shaping the AC input current into a quasi-sinusoidal waveform. The PFC switch, which can be but won't be limited to a power Metal-Oxide-Semiconductor Field Effect Transistor (MOSFET) or a power Bipolar Junction Transistor (BJT), has its source or emitter connected to the reference ground in the primary side. The PFC rectifier, which is placed at the primary high side, can be but won't be limited to a diode rectifier or a MOSFET rectifier.

The PWM stage, consisting of a flyback input capacitor, a flyback transformer, a flyback switch, a flyback rectifier, and a flyback output capacitor as a rear-end post-regulator, also has two functions: stepping a higher regulated DC output voltage (390~410 Vdc typical) down to a lower regulated DC output voltage (5~48 Vdc typical) and providing galvanic isolation between the primary and the secondary side. The PWM switch, which can be but won't be limited to a power MOSFET or a power BJT, has its source or emitter connected to the reference ground in the primary side. The PWM rectifier, which can be placed either at the secondary high side or at the secondary low side, can be but won't be limited to a diode rectifier or a synchronous rectifier.

The PFC output capacitor itself is the PWM input capacitor, so the PFC stage and the PWM stage are decoupled by the PFC output/PWM input capacitor.

The disclosed controller, which can have but won't be limited to having 6 exemplary pins: a PFC input voltage sense pin, a PFC output load/PWM input voltage sense pin, a PWM output load sense pin, a PFC gate or base drive pin, a PWM gate or base drive pin, and a GND pin, has its PFC input voltage sense pin connected to the input terminal of the PFC stage, its PFC output load/PWM input voltage sense pin connected to the output terminal of the PFC stage or the input terminal of the PWM stage, its PWM output load sense pin optocoupled to the output terminal of the PWM stage, its PFC gate or base drive pin connected to the gate or base of the PFC switch, its PWM gate or base drive pin connected to the gate or base of the PWM switch, and its GND pin connected to the reference ground in the primary side.

It's worth mentioning that the disclosed controller, encompassed within the spirit and scope of the present invention, can be realized in any shape or form, be it analog or digital; discrete or integrated.

Each frequency-load curve has four operating modes: Holdup Mode (HM), Burst Mode (BM), Discontinuous Conduction Mode (DCM), and Continuous Conduction Mode (CCM). The disclosed controller selects a frequency-load curve among the plurality of frequency-load curves and controls the PFC stage and the PWM stage to operate in HM, BM, DCM, or CCM based on the combined result from the input voltage and the output load sense signal, fetched respectively from the input terminal of the PFC stage and the output terminal of the PWM stage. More specifically, the disclosed controller would have the PSU operate in HM in case of no load, in BM in case of little load, in DCM in case of light load, or in CCM in case of heavy load across the flyback output rail. In other words, the integrated controller controls the PSU to operate in BM, DCM and CCM as the load increases.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
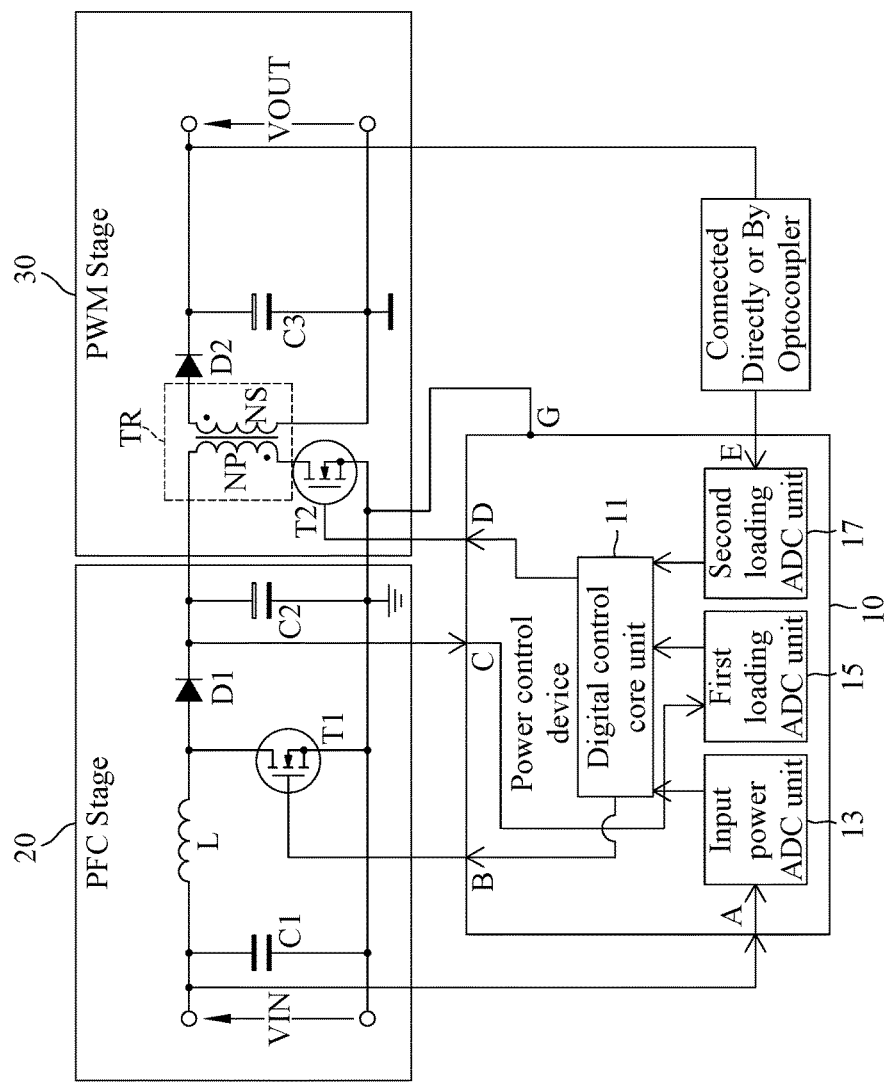
FIG. 1 shows a schematic of a CCM PFC in conjunction with a SS-QR flyback converter, built around an integrated PFC and PWM controller with a plurality of frequency-load curves according to one embodiment of the present invention.

Please refer to FIG. 1 for a schematic of a CCM PFC in conjunction with a SS-QR flyback converter, built around an integrated PFC and PWM controller with a plurality of frequency-load curves according to one embodiment of the present invention.

The PFC stage 20, consisting of a PFC input capacitor C1, a PFC inductor L, a PFC switch T1, a PFC rectifier D1, and a PFC output capacitor C2 as a front-end pre-regulator, has two functions: stepping a lower sinusoidal DC input voltage (0~373 Vdc typical) up to a higher regulated DC output voltage (390~410 Vdc typical) and shaping the AC input current into a quasi-sinusoidal waveform. The PFC switch T1, which can be but won't be limited to a power MOSFET or a power BJT, has its source or emitter connected to the reference ground in the primary side. The PFC rectifier D1, which is placed at the primary high side, can be but won't be limited to a diode rectifier or a MOSFET rectifier.

The PWM stage 30, consisting of a flyback input capacitor C2, a flyback transformer TR, a flyback switch T2, a flyback rectifier D2, and a flyback output capacitor C3 as a rear-end post-regulator, also has two functions: stepping a higher regulated DC output voltage (390~410 Vdc typical) down to a lower regulated DC output voltage (5~48 Vdc typical) and providing galvanic isolation between the primary and the secondary side. The flyback switch T2, which can be but won't be limited to a power MOSFET or a power BJT, has its source or emitter connected to the reference ground in the primary side. The PWM rectifier D2, which can be placed either at the secondary high side or at the secondary low side, can be but won't be limited to a diode rectifier or a synchronous rectifier.

The PFC output capacitor C2 itself is the PWM input capacitor C2, so the PFC stage 20 and the PWM stage 30 are decoupled by the PFC output/PWM input capacitor C2.

The disclosed controller 10, which can have but won't be limited to having 6 exemplary pins: a PFC input voltage sense pin A, a PFC output load/PWM input voltage sense pin C, a PWM output load sense pin E, a PFC gate or base drive pin B, a PWM gate or base drive pin D, and a GND pin G, has its PFC input voltage sense pin A connected to the input terminal of the PFC stage 20, its PFC output load/PWM input voltage sense pin C connected to the output terminal of the PFC stage 20 or the input terminal of the PWM stage 30, its PWM output load sense pin E optocoupled to the output terminal of the PWM stage 30, its PFC gate or base drive pin B connected to the gate or base of the PFC switch T1, its PWM gate or base drive pin D connected to the gate or base of the flyback switch T2, and its GND pin G connected to the reference ground in the primary side.

Although exemplarily shown in FIG. 1 as a digital Integrated Circuit (IC) with stronger immunity against noise or interference at a higher cost, the disclosed controller 10, encompassed within the spirit and scope of the present invention, can be realized in any shape or form, be it analog or digital; discrete or integrated.

Each frequency-load curve has four operating modes: HM, BM, DCM, and CCM. The disclosed controller 10 selects a frequency-load curve among the plurality of frequency-load curves and controls the PFC stage 20 and the PWM stage 30 to operate in HM, BM, DCM, or CCM based on the combined result from the input voltage and the output load sense signals, fetched respectively from the input terminal of the PFC stage 20 and the output terminal of the PWM stage 30. More specifically, the disclosed controller 10 would have the PSU operate in HM in case of no load, in BM in case of little load, in DCM in case of light load, or in CCM in case of heavy load across the flyback output rail. In other words, the integrated controller controls the PSU to operate in BM, DCM and CCM as the load increases.

Figure 2:
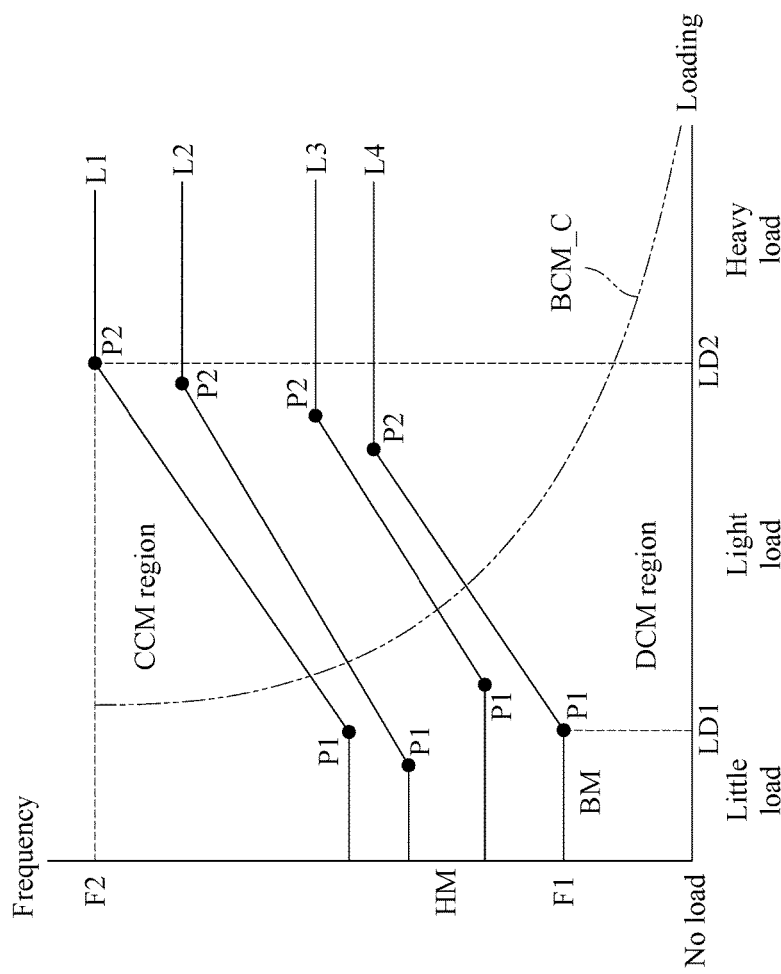
FIG. 2 gives a sketch of a plurality of frequency-load curves on the frequency-load plane, parameterized by a plurality of Root-Mean-Square (RMS) PFC input voltage ranges.

Now, please turn to FIG. 2 for a sketch of a plurality of frequency-load curves on the frequency-load plane, parameterized by a plurality of RMS PFC input voltage ranges.

With consideration for an universal AC input voltage range of 90~264 Vrms, a typical example of 4 frequency-load curves, a first frequency-load curve L1, a second frequency-load curve L2, a third frequency-load curve L3, and a fourth frequency-load curve L4, in correspondence to 4 RMS PFC input voltage ranges, below 95 Vrms, between 95 and 170 Vrms, between 170 and 250 Vrms, and above 250 Vrms, is given to make the central idea clear and concise. The 4 exemplary voltage ranges, defined for concretization of the inventive concept, not for limitation on the present invention, can be arbitrarily tailored to fit the actual needs.

More specifically, each frequency-load curve consists of three consecutive segments, a first segment, a second segment, and a third segment, where the first and the second segment join at a first joint P1, whose horizontal and vertical coordinate are respectively the first load LD1 and the first frequency F1, as well as the second and the third segment join at a second joint P2, whose horizontal and vertical coordinate are respectively the second load LD2 and the second frequency F2. The first and the third segments are a horizontal line, where the frequency stays level as the load becomes heavy, while the second segment is a non-decreasing curve, where the frequency goes up or stays level as the load becomes heavy. For fear of core saturation of the PFC inductor and the flyback transformer, the second frequency F2 must be higher than the first frequency F1 because the second load LD2 is heavier than the first load LD1 and the flux density in the magnetic circuit is approximately in proportion to the electric current in the electric circuit. In other words, the second joint P2 at a second load LD2 and a second frequency F2 is always located at the upper right of the first joint P1 at a first load LD1 and a first frequency F1. A frequency-load curve for a lower RMS PFC input voltage range is always located at the top of a frequency-load curve for a higher RMS PFC input voltage range because the frequency can be reasonably reduced without causing core saturation when the PFC inductor current and the flyback transformer current, and thus the resulting flux densities, decrease with an increased RMS PFC input voltage if the load stays constant. So, from the top down the first frequency-load curve L1, the second frequency-load curve L2, the third frequency-load curve L3, and the fourth frequency-load curve L4 are sequentially deployed.

As far as the average efficiencies optimization at the high or low line is concerned, the first joint P1 is allowed to have either a heavier or lighter load while the second joint P2 is expected to have a lighter load as the RMS PFC input voltage range goes up so that the PSU would dwell more in DCM in case of a higher RMS PFC input voltage range so as to optimize high-line average efficiencies by means of minimizing the dominant switching loss and more in CCM in case of a lower RMS PFC input voltage range so as to optimize low-line average efficiencies by means of minimizing the dominant conduction loss.

Further, a Boundary Conduction Mode (BCM) curve BCM_C is the curve partitioning the second and the third segments into two parts: the first part falls into the DCM region and the second part into the CCM region. To gain more insight into the BCM curve BCM_C on the frequency-load plane, let's consider the flyback converter case:

$$\begin{cases} P_o = V_o I_o = \frac{1}{2} L_p I_{pk}^2 f_s \eta \\ V_i = L_p \frac{I_{pk}}{DT_s} \\ V_i D = n V_o (1-D) \end{cases} \Rightarrow f_s = \frac{\left(\frac{1}{\frac{1}{V_i} + \frac{1}{nV_o}}\right)^2 \eta}{2 L_p V_o I_o}.$$

The BCM curve BCM_C can be specifically described as follows: the frequency fs is plotted as a function of the load To to draw the line between the DCM and the CCM region, where the flyback input voltage Vi is treated as a parameter. As such, there would be a plurality of BCM curves on the frequency-load plane, i.e. there would be a BCM curve family. For simplicity, only one BCM curve BCM_C is shown. The frequency fs on the BCM curve BCM _C is inversely proportional to the load Io at a fixed flyback input voltage Vi and would decrease or increase with the decrease or increase in the flyback input voltage Vi at a fixed load Io.

Figure 3:
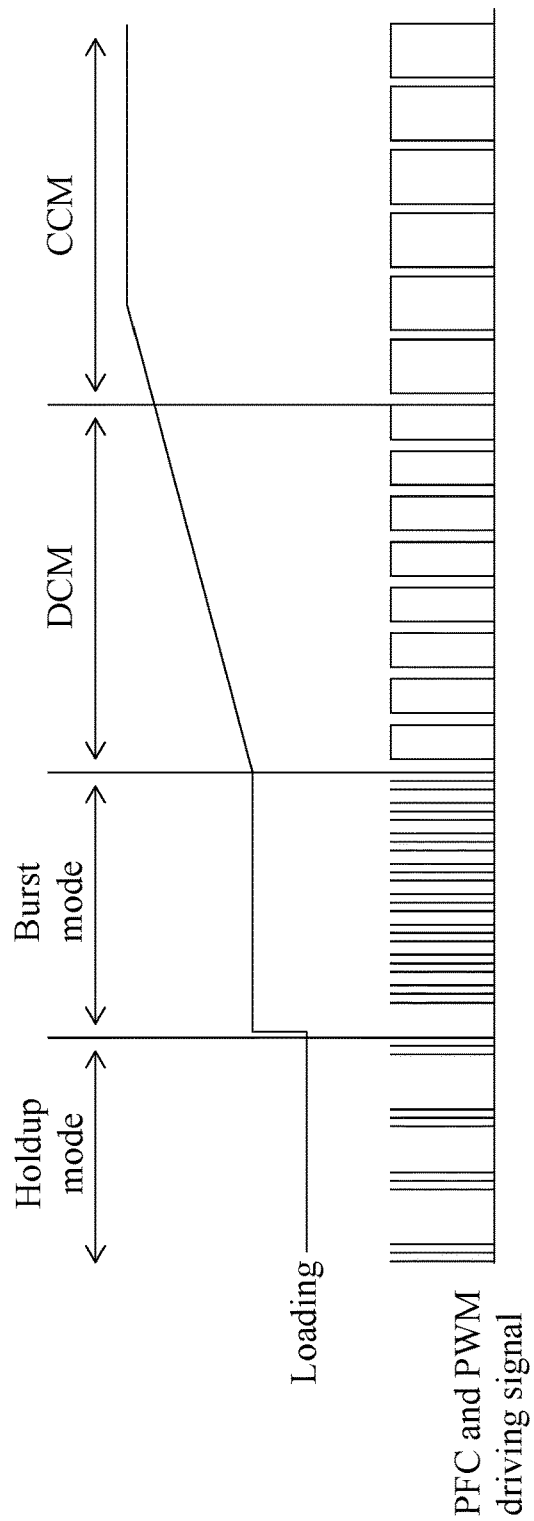
FIG. 3 depicts a train of gate drive pulses in the sequence of HM, BM, DCM, and CCM operation, respectively corresponding to no load, little load, light load, and heavy load across the flyback output rail.

It becomes apparent that each frequency-load curve has four operating modes: HM (on the frequency axis), BM (on the first segment), DCM (between the first joint P1 and the BCM curve BCM_C), and CCM (above the BCM curve BCM_C). Please take a look at FIG. 3, which depicts a train of gate drive pulses in the sequence of HM, BM, DCM, and CCM operation, respectively corresponding to no load, little load, light load, and heavy load across the flyback output rail. It goes without saying that all the typical values above are given for concretization of the inventive concept instead of limitation on the present invention and that the SS-QR flyback converter, exemplified for elaboration, not for limitation, can be reconfigured as a DS-QR flyback converter, where the high-side flyback switch and the low-side flyback switch are simultaneously switched on and off by the flyback gate or base drive pin with the use of a pulse transformer or a driver IC for the high-side drive and isolation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An integrated Power Factor Correction (PFC) and Pulse Width Modulation (PWM) controller employed in collocation with a PFC stage and a PWM stage, comprising a PFC input voltage sense pin, a PFC output load/PWM input voltage sense pin, a PWM output load sense pin, a PFC gate or base drive pin, a PWM gate or base drive pin, and a GND pin for sensing and driving the PFC stage and the PWM stage, and having a plurality of frequency-load curves deployed on a frequency-load plane to minimize no-load power consumption and maximize 4-point average efficiencies, wherein the PFC input voltage sense pin, the PFC output load/PWM input voltage sense pin, the PFC gate or base drive pin, and the GND pin are connected to the PFC stage, the PFC output load/PWM input voltage sense pin, the PWM output load sense pin, the PWM gate or base drive pin, and the GND pin are connected or optocoupled to the PWM stage, the plurality of frequency-load curves, parameterized by a plurality of Root-Mean-Square (RMS) PFC input voltage ranges, are deployed on the frequency-load plane to optimize Power Supply Unit (PSU) performance, each of the frequency-load curves comprises a first segment, a second segment, and a third segment to be allocated to four operating modes: Holdup Mode (HM), Burst Mode (BM), Discontinuous Conduction Mode (DCM), and Continuous Conduction Mode (CCM), the first segment and the second segment join at a first joint, whose horizontal coordinate and vertical coordinate are respectively a first load and a first frequency, the second segment and the third segment join at a second joint, whose horizontal coordinate and vertical coordinate are respectively a second load heavier than the first load and a second frequency higher than the first frequency, the frequency-load curve for a lower RMS PFC input voltage range is located above the frequency-load curve for a higher RMS PFC input voltage range, the integrated PFC and PWM controller selects a frequency-load curve among the plurality of frequency-load curves and controls the PFC stage and the PWM stage to operate in HM, BM, DCM, or CCM based on an input voltage fetched from an input terminal of the PFC stage and an output load sense signal fetched from an output terminal of the PWM stage, and the integrated PFC and PWM controller has a PSU operate in HM in case of no load, and operate in BM, DCM and CCM as the load increases.

2. The integrated PFC and PWM controller as claimed in claim 1, wherein in the first segment and the third segment, the frequency stays constant as the load varies, and in the second segment the frequency goes up or stays constant as the load increases.

3. The integrated PFC and PWM controller as claimed in claim 1, wherein the first joint of the frequency-load curve for a lower RMS PFC input voltage range may have a load lighter or heavier than the load of first joint of the frequency-load curve for a higher RMS PFC input voltage range while the second joint of the frequency-load curve for a lower RMS PFC input voltage range always has a load heavier than the load of the second joint of the frequency-load curve for a higher RMS PFC input voltage range.

4. The integrated PFC and PWM controller as claimed in claim 1, further having at least one Boundary Conduction Mode (BCM) curve defined on the frequency-load plane, wherein the at least one BCM curve partitions the second and the third segments into a first part and a second part, the first part falls into a DCM region and the second part into a CCM region, and the frequency on the at least one BCM curve is inversely proportional to the load if a flyback input voltage of a flyback converter realized by the integrated PFC and PWM controller is fixed and the frequency on the at least one BCM curve decreases or increases as the flyback input voltage decreases or increases if the load is fixed.

5. The integrated PFC and PWM controller as claimed in claim 4, wherein HM is operated at no load, BM is operated on the first segment, DCM is operated between the first joint and the BCM curve, and CCM is operated above the BCM curve.

6. The integrated PFC and PWM controller as claimed in claim 1, wherein the PFC stage comprises a PFC input capacitor, a PFC inductor, a PFC switch, a PFC rectifier, and a PFC output capacitor, the PFC switch is a power Metal-Oxide-Semiconductor Field Effect Transistor (MOSFET) or a power Bipolar Junction Transistor (BJT), and has its source or emitter connected to a reference ground in a primary side, and the PFC rectifier is a diode rectifier or a MOSFET rectifier, placed at a primary high side.

7. The integrated PFC and PWM controller as claimed in claim 6, wherein the PWM stage comprises a flyback input capacitor, a flyback transformer, a flyback switch, a flyback rectifier, and a flyback output capacitor, the flyback switch is a power MOSFET or a power BJT, and has its source or emitter connected to the reference ground in the primary side, the flyback rectifier is a diode rectifier or a synchronous rectifier, placed either at a secondary high side or at a secondary low side, the PFC output capacitor itself is a PWM input capacitor which is also the flyback input capacitor, and the PFC stage and the PWM stage are decoupled by the PFC output/PWM input capacitor.

8. The integrated PFC and PWM controller as claimed in claim 7, wherein the PFC input voltage sense pin is connected to the input terminal of the PFC stage, the PFC output load/PWM input voltage sense pin is connected to an input terminal of the PWM stage, the PWM output load sense pin is optocoupled to the output terminal of the PWM stage, the PFC gate or base drive pin is connected to the gate or base of the PFC switch, the PWM gate or base drive pin is connected to the gate or base of the flyback switch, and the GND pin is connected to the reference ground in the primary side.

* * * * *